March 1, 1960  G. L. HAZEN  2,926,629
FEEDING DEVICE
Filed July 14, 1958  5 Sheets-Sheet 5
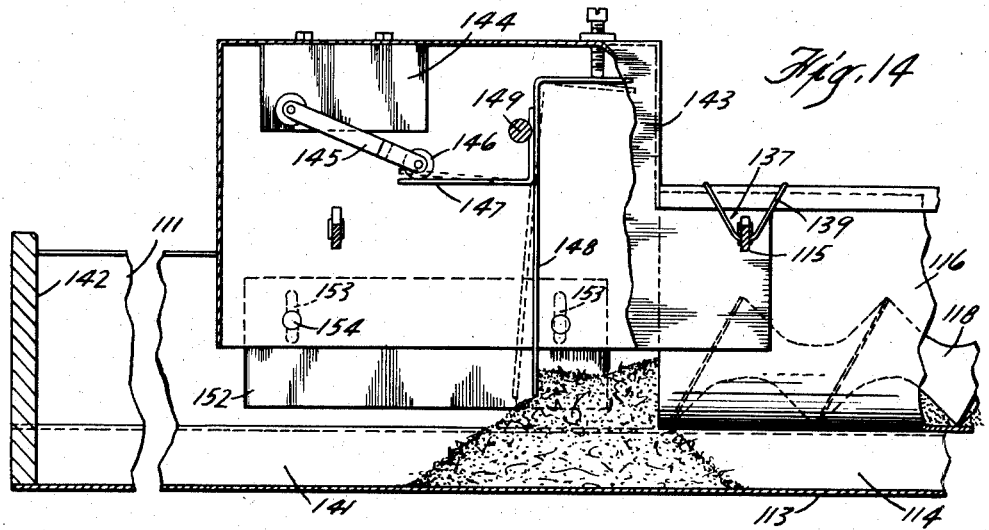
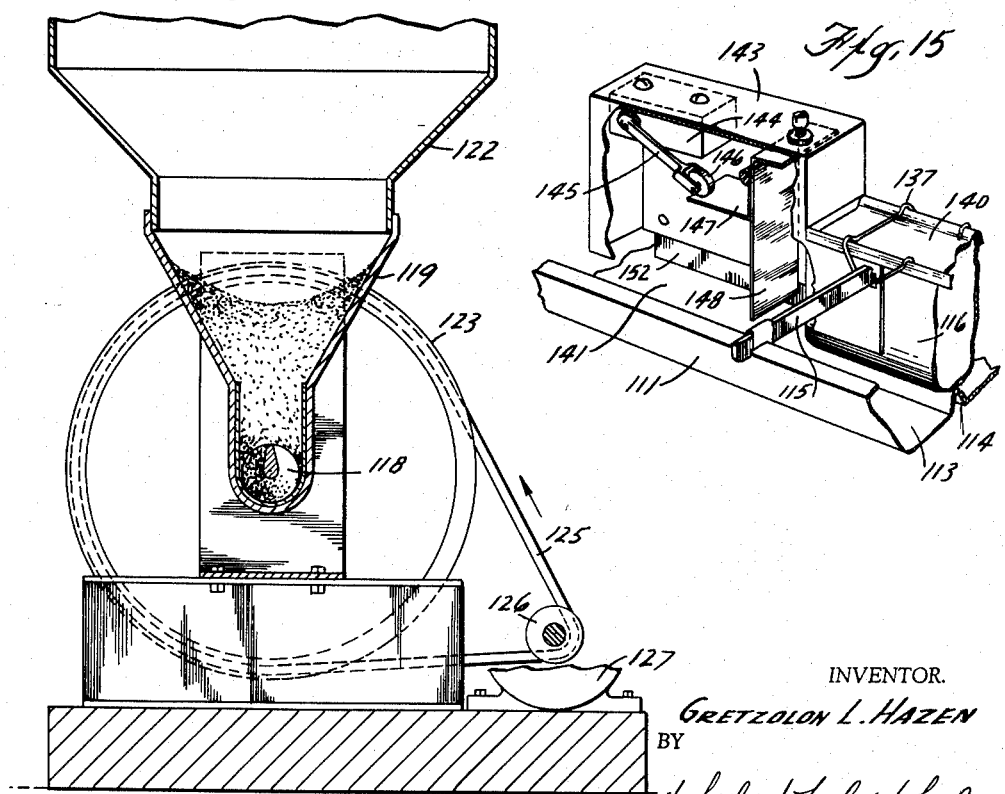
INVENTOR.
GRETZOLON L. HAZEN
BY
Wheeler, Wheeler & Wheeler
ATTORNEYS United States Patent Office 2,926,629
Patented Mar. 1, 1960

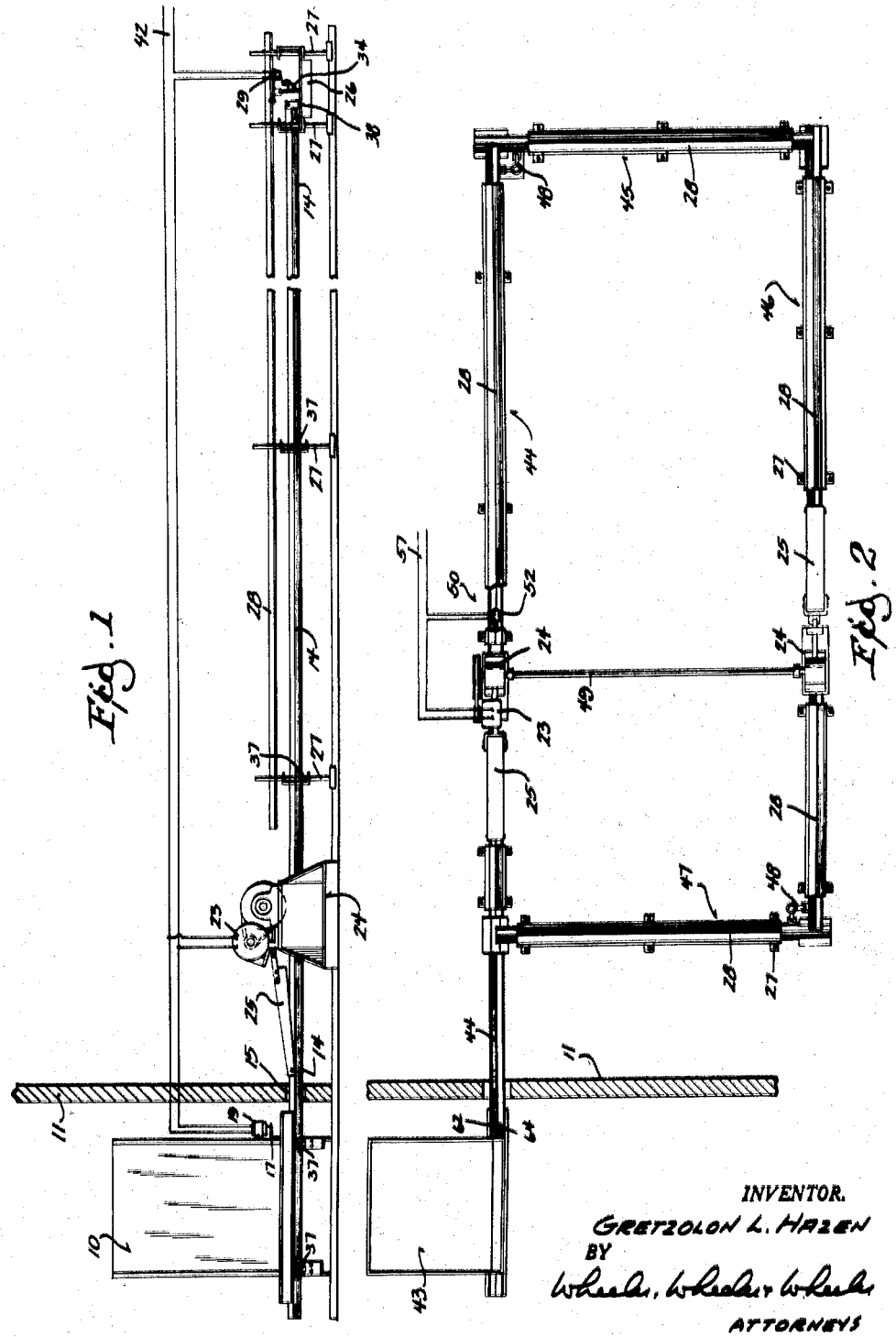

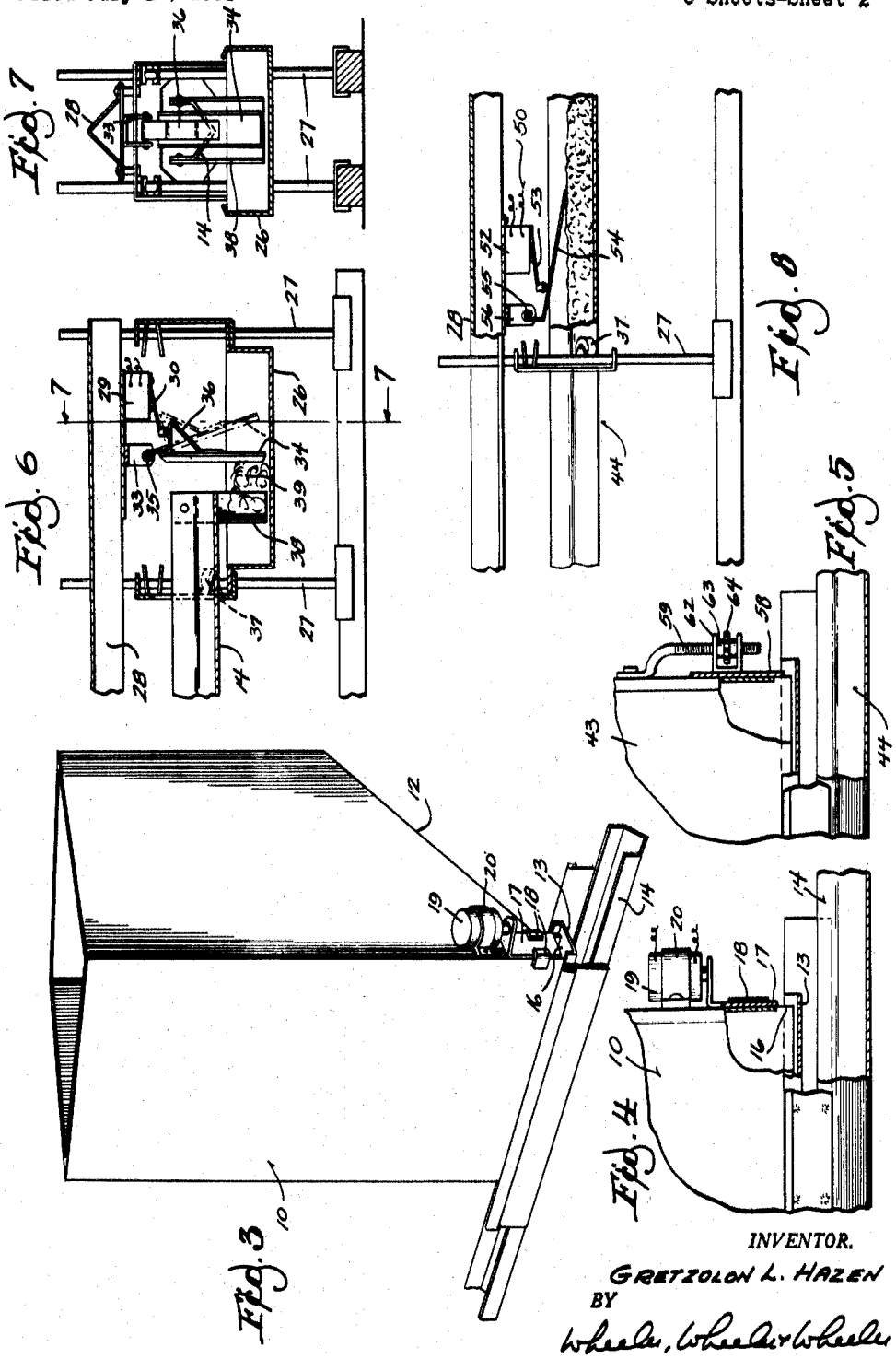

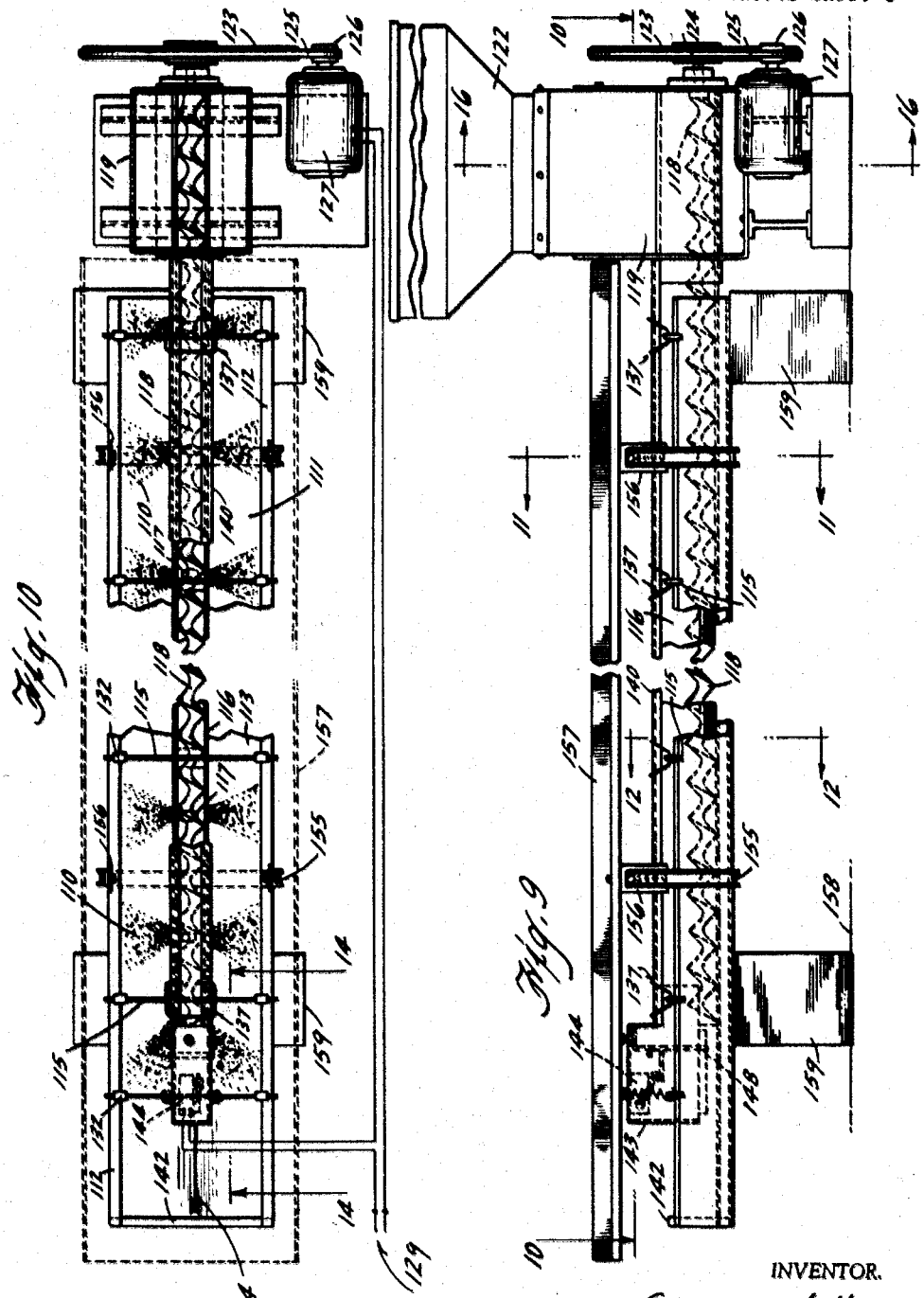

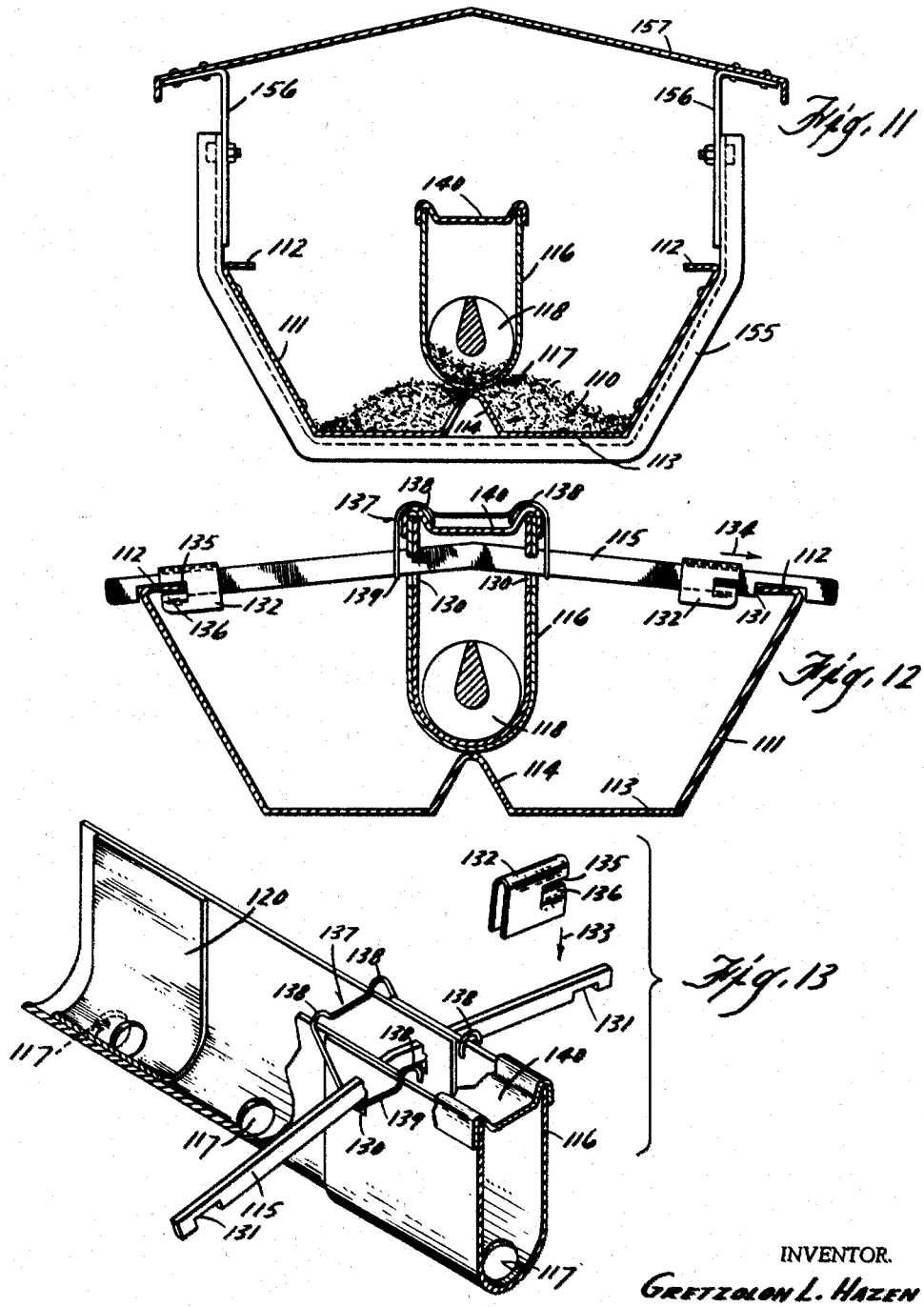

2,926,629

FEEDING DEVICE

Gretzolon L. Hazen, Fort Atkinson, Wis., assignor, by mesne assignments, to Rockwood & Co., Chicago, Ill., a corporation of Delaware Application July 14, 1958, Serial No. 748,289

20 Claims. (Cl. 119—52)

This invention relates to a poultry feeding device.

This application is a continuation in part of my copending applications, Serial No. 618,816, filed October 29, 1956, and Serial No. 385,539, filed October 12, 1953, both now abandoned. Cross reference is also made to my Patent No. 2,745,539, the application for which was copending with application Serial No. 385,539 aforesaid.

In the device of my patent aforesaid, the sensing mechanism for regulating flow of feed in the system is disposed adjacent the feed hopper and is actuated in response to the aggregate of newly added and returned feed in a closed circuit trough system in which the feed traverses a complete loop back to the hopper and adjacent sensing element, as is also shown in United States Patent No. 2,742,138. In the device of the present invention the control apparatus may be remote from the hopper and the feed need not return thereto to exercise control. In the device of the present invention the supply of feed from the hopper to the trough may be regulated in response to the condition of the feed at the end of an open circuit feeding device.

The device of the present invention is of particular utility in a construction in which the feed hopper is in a room separate and apart from the poultry house, thus permitting the operator to service the hopper without disturbing the fowl in the poultry house.

Embodiments of the invention employing shaker or reciprocating conveyors and an embodiment of the invention employing an auger conveyor are illustrated. In all such embodiments a control switch actuated by the thrust of feed propelled by the conveyor is in a circuit with means for controlling flow of feed along the trough.

The auger type device of the present invention distributes feed substantially uniformly along a distributing trough so that where the feed contains different granular ingredients, substantially equal proportions of such ingredients will be supplied to all portions of the distribution trough. Accordingly, the larger birds cannot preempt the choice grain to the exclusion of smaller and younger birds. The feed is confined in an auger conveyor trough and is deposited therefrom at spaced points into the distributing trough. Accordingly, all of the poultry feeding therefrom will receive substantially the same diet.

In the auger type embodiment of the present invention, the conveyor trough is elevated above the level of the bottom of the distributor trough, the conveying trough being provided with spaced holes at its bottom from which feed may be discharged downwardly into the distributing trough and thence laterally. To assist in the lateral flow of feed, the bottom wall of the distributing trough may be provided with a medial V-shaped rib which distributes laterally the feed that issues from the openings in the bottom of the conveyor trough.

The invention further relates to novel means for quickly assembling and disassembling the component parts of the auger type feeder, thus to facilitate installation, repair and cleaning thereof. Novel spring clips are provided for holding the parts together without need for screws or other time-consuming fasteners.

Other features, advantages and objects of the invention will appear from the following disclosure in which:

Fig. 1 is a side elevation of an open circuit reciprocating conveyor type feed apparatus embodying the present invention.

Fig. 2 is a plan view of a closed circuit reciprocating conveyor type feeding system which also incorporates features of the present invention.

Fig. 3 is a perspective view of a hopper, associated trough and hopper gate adapted for use with the apparatus of Figs. 1 and 2.

Fig. 4 is an enlarged fragmentary view, partly in elevation and partly in section, of the device shown in Fig. 3.

Fig. 5 is an enlarged fragmentary view, partially in elevation and partially in section, of a trough, hopper and manually operated gate adapted for use in apparatus of the present invention.

Fig. 6 is an enlarged fragmentary cross section along the line 6—6 of Fig. 7 taken through a remote feed pan and sensing element for the end of an open circuit reciprocating conveyor type embodiment of the present invention.

Fig. 7 is a cross sectional view taken along the line 7—7 of Fig. 6.

Fig. 8 is an enlarged fragmentary view, partially in elevation and partially in cross section, taken through a remote sensing element adapted to be disposed intermediate the ends of a reciprocating conveyor trough in a closed circuit embodiment of the present invention.

Fig. 9 is a fragmentary side elevation of an auger type feeder embodying the invention.

Fig. 10 is a cross section taken along the line 10—10 of Fig. 9.

Fig. 11 is a cross sectional view taken along the line 11—11 of Fig. 9.

Fig. 12 is a cross sectional view taken along the line 12—12 of Fig. 9.

Fig. 13 is a fragmentary perspective view of a portion of the auger type conveyor trough and the conveyor trough hanger.

Fig. 14 is a vertical cross section taken through switching apparatus disposed at the end of the auger type trough and along the line 14—14 of Fig. 10.

Fig. 15 is a perspective view of the device shown in Fig. 14.

Fig. 16 is a cross section taken along the line 16—16 of Fig. 9.

The embodiments shown in Figs. 1–8 will be first described. As best shown in Fig. 1 the feed hopper 10 may be disposed at one side of wall 11 in a room separate and apart from the poultry feeding room at the other side of wall 11. The hopper 10 may be of the type illustrated in my Patent 2,745,539 aforesaid and as best shown in Fig. 3 has an inclined bottom 12 down which feed is fed by gravity onto the false bottom 13 of reciprocating feed trough 14. Feed trough 14 may extend through the opening 15 in wall 11.

Feed may be discharged from hopper 10 into trough 14 through the hopper end wall opening 16 as controlled by gate 17. Gate 17 is reciprocated in its marginal slideways 18 by solenoid 19. The solenoid is mounted by means of the band 20 on the side wall of the hopper 10.

Reciprocating motion is imparted to trough 14 by means of the electric motor 23 which drives the shaker conveyor mechanism 24 which may be of the type shown in my copending abandoned application, Serial No.

294,416, filed June 19, 1952. Reciprocating mechanism 24 communicates motion through drive arm 25 to the trough 14. The trough is moved in one direction of reciprocation at a faster rate of speed than in the other direction of reciprocation, thus causing progressive movement of the feed in the trough from the hopper toward a remote control station such as the pan 26 shown in Fig. 1. Trough 14 may be adjustably supported on standards 27 of the type shown in Patent 2,742,138. The standards may also carry a roof 28 to cover the feed trough.

As best shown in Figs. 6 and 7 the undersurface of stationary roof 28 is provided above the level of pan 26 with a microswitch 29 having an actuating arm 30. Also mounted on the undersurface of roof 28 on the bracket 33 is a sensing element or feeder paddle or plate 34 pivotally connected to the bracket 33 on a pintle 35. Plate 34 is provided with a lateral projection 36 which engages the operating arm 30 of the switch 29.

Trough 14 is movable on rollers 37 with respect to the pan 26. The end of the trough 14 is provided with a depending pusher plate 38 which pushes the accumulation 39 of feed delivered to the pan from trough 14 toward and against the feeler paddle 34 in the course of trough reciprocation.

Either or both the solenoid 19 and the motor 23 may be connected electrically to the line 42, the microswitch 29 being in series therewith. For the hopper shown in Figs. 2 and 5, only the motor is controlled. In other embodiments of the invention I may prefer to control only the gate, leaving the motor to run continuously. In the hookup of Fig. 1 the gate and motor are operated concurrently. In Fig. 1 when switch 29 is closed, solenoid 19 will lift the gate 17 and will energize motor 23 to cause reciprocation of the trough 14 to convey feed from hopper 10 along the trough 14 and into the pan 26. As soon as the pan 26 is full and pusher 38 pushes enough feed against the feeler plate 34 to raise it to a predetermined height, projection 36 thereon will actuate arm 30 of the switch 29 to open the circuit and both solenoid 19 and motor 23 will be de-energized. Gate 17 then closes and drive mechanism 24 stops.

The birds may continue to feed from the trough and from the pan 26 until the level of the feed beneath sensing element 34 has been lowered to a predetermined minimum height at which time the pressure of projection 36 against microswitch arm 30 will be released to permit the microswitch 29 to close and re-establish the circuit to the solenoid 19 and motor 23. Gate 17 will thereupon open and drive mechanism 24 will start and the apparatus will convey feed down trough 14 until switch 29 is again opened in response to the pressure of feed thereagainst.

Fig. 2 illustrates a closed circuit feeding apparatus. In this embodiment of the invention the feed hopper 43 may again be in a room separate from the poultry. The circuit comprises troughs 44, 45, 46 and 47 which are interconnected at opposite corners by bell cranks 48 which communicate motion from one trough to the next as also shown in Patent 2,742,138. Troughs 44, 46 may be powered by reciprocating motors 24, the electric motor 23 having a cross shaft 49 interconnecting motors 24. In the feeding apparatus shown in Fig. 2 the remote control apparatus 50 may be disposed intermediate the ends of trough 44 as best shown in Fig. 8.

As in the previously described embodiment of the invention, the trough 44 may be supported on standards 27 provided with rollers 37 on which the trough is free to roll. The stationary roof 28 is provided with a microswitch 52 having an actuating arm 53 engaged by the sensing element or feeler plate 54 pivotally connected at 55 to the bracket 56 mounted on the undersurface of the stationary roof 28. The microswitch 52 may be connected in series in the line 57 with the motor 23. Accordingly, when feed has reached a predetermined maximum level in trough 44 switch 52 is opened by pressure of the feeler 54 on switch arm 53 to de-energize the motor 23. After the birds have eaten feed from beneath the feeler 54 to permit the feeler to drop to a predetermined minimum level, microswitch 52 will close to re-energize motor 23 and cause further flow of feed along the circuit.

Where the flow of feed is regulated solely by control of motor 23, the gate 58 (Fig. 5) or hopper 43 may be provided with a manually actuated opening and closing mechanism which may simply consist of a threaded rod 59 passing through a clevis 62 mounted on a gate, there being a threaded operating nut 63 threaded to the rod 56 and between the arms of the clevis 62. Operating nut 63 may be provided with a knurled operating knob 64. When reciprocation of the trough 44 stops, feed will no longer flow through the opening beneath the gate 58.

The auger type embodiment of the invention disclosed for exemplification in Figs. 9-16 is particularly adapted to feed turkeys, although broadly any type of poultry may feed therefrom.

The device comprises a relatively wide distributing trough 111 having inwardly turned flanges 112 along the upper margins of its side walls and a bottom wall 113 having an inverted V-shaped medial rib 114 which functions as a deflector as will hereinafter appear. Suspended on the hanger bars or cross arms 115 is a narrower conveyor trough 116 having openings 117 spaced along the bottom thereof on about 12" centers. The bottom wall of the trough 116 is curved on a radius just slightly greater than the radius of the helical flights of conveyor auger 118 which rides in the conveyor trough 116. The auger 118 also passes through the discharge spout 119 of a feed hopper 122 from which feed is delivered by gravity to the auger 118 and is thence conveyed by auger 118 along the conveying trough 116. The auger 118 is driven from pulley 123 mounted on auger shaft 124. Drive belt 125 is trained both about the pulley 123 and the drive pulley 126 of motor 127.

As best shown in Fig. 11, the openings 117 in the curved bottom wall of the conveyor trough 116 are slightly offset arcuately about the curve of said bottom wall from the medial center line of the trough 116 and in the direction against which the auger 118 rotates, hence to compensate for the side thrust imparted to the feed by auger rotation. The feed will be discharged by gravity vertically downwardly through the opening 117 and will be spread laterally by gravity flow along the side walls of the rib 114 to spread along the bottom wall 113 of the distributor trough 111, as shown at 110 in Fig. 10. The feed will initially be localized in the vicinity of the openings 117, but the birds will scatter it to a relatively uniform depth as they feed from the trough.

Inasmuch as feed 110 in the conveyor trough 116 is isolated from the poultry, the same proportion of feed ingredients will issue from the last opening 117 as from the first. Accordingly, all birds along the distributing trough will receive the same balanced diet. To regulate flow of feed through the openings 117, I may provide each such opening with a slide valve 120, as shown in Fig. 13.

For ease in assembly and disassembly of the device shown in Figs. 10-18, screws, bolts, etc. are eliminated in favor of simplified snap clips. As best shown in Figs. 12 and 13, adjacent lengths or sections of conveyor trough 116 will be overlapped at their contiguous ends and suspended from the side walls of the distributor trough 111 by cross arms or hangers 115. Respective end portions of the trough 116 are provided with side openings 130 through which cross arm 115 extends to support the weight of the conveyor trough sections 116 thereon. The distal ends of the cross arms 115 are notched at 131 to fit over and receive therewithin the flanges 112 of the distributing trough 111. Spring clips 132 which are U-shaped in cross section may be received over the cross arms 115 by movement of the clips 132 in the direction of arrow 134 in Fig. 12 to engage with the lip 112, as best shown at the left-hand side of Fig. 12. For this purpose, the clips 132 are notched at 135 and are provided with in-turned flange portions 136 which lock under their own resilient bias beneath the lips 112 on the distributor trough to anchor the cross arms 115 in position.

The conveyor trough sections 116 are fastened to the cross arms 115 by means of the spring wire fasteners 137. These fasteners have hook portions 138 which engage over the upwardly exposed edges of the trough section 116 and have intermediate spring portions 139 which engage beneath the cross arms 115 to resiliently bias the margins of the sections 116 about the openings 130 against the cross arms 115. I may optionally provide a channel-shaped top 140 to cover the trough 116 and which desirably intervenes between the top edges of the trough 116 and hook portions 138 of the spring fasteners 137 to be held in place by the spring fasteners 137.

The end of the last section 116 of the conveyor trough is spaced from the end wall 142 which closes the end of the distributing trough 111. In this space is provided the feed sensing mechanism by which the motor 127 is controlled. The end of the last conveyor trough 116 is left open to discharge feed into end pan portion 141 of distributing trough 111. Pan portion 141 is partially covered by a housing 143 on the top wall of which is mounted a switch 144 having a switch actuator arm 145 with a roller 146 beneath which the actuating arm 147 of sensing paddle 148 is disposed. The paddle is pivotally mounted on the pin 149 journaled in the side walls of the housing 143. As feed is discharged from the end of trough section 116 under pressure of the auger 118, it will be pushed against the paddle 148 to cause the paddle to pivot in a clockwise direction in Figs. 14 and 15 (to the dotted line position shown in Fig. 14) and thus lift the actuator arm 145 of the switch 144 to de-energize motor 127 through wiring connections 129.

As the poultry eat and remove feed from around the paddle 148, it will tend to move by gravity towards its full line position in Fig. 14 in which the lever 145 will drop to actuate switch 144 and re-start the motor 142 to resume auger rotation to feed the grain along the conveyor trough 116. The auger will continue to rotate until feed has been discharged through all of the openings 117 and until such feed as is left in the conveyor trough is again pushed by the auger against the paddle 148 to re-close switch 144 and de-energize the motor.

In all embodiments of the invention the sensing paddle is responsive to the pressure of feed pushed thereagainst by the feed conveyor, whether it be a reciprocating conveyor as shown in Figs. 1–8, or an auger conveyor as shown in Figs. 9–16.

I may optionally provide the housing 143 of Figs. 14, 15 with side plate extensions 152 having vertically elongated slots 153 through which bolts 154 fasten the plates 152 in vertically adjustable relation to the bottom 113 of trough 113. Plate extensions 152 are adjusted for optimum restraint of lateral flow of feed as it is discharged from trough 116.

The distributing trough 111 is reinforced laterally by longitudinally spaced channel brackets 155 which have bolted thereto upwardly extending roof support brackets 156 on which trough roof 157 is supported. The trough 111 may be elevated a suitable height above the level of floor 158 on blocks 159.

I claim:

1. A feeder comprising a feed trough, means for moving feed along the trough, a control station substantially in the path of feed moving along said trough, regulating means for controlling the flow of feed along the trough and including a feed-sensing element at said station and in the path of feed moving along the trough, said sensing element comprising means responsive to the pressure of feed pushed thereagainst by the means for moving feed along the trough and control connections between said regulating means and said feed-sensing element for regulating flow of feed along the trough according to the relative pressure of said feed against said pressure-responsive means.

2. The device of claim 1 in which the means for moving feed along the trough comprises a motor for reciprocating the trough.

3. The device of claim 1 in which the means for moving feed along the trough comprises an auger in the trough and a motor for turning the auger.

4. The device of claim 1 in which said control station comprises a pan at one extremity of the trough and toward and into which the means for moving feed along the trough discharge feed, said sensing element being disposed at said pan whereby said control means is actuated in accordance with the condition of feed in said pan.

5. The device of claim 4 in which the means for moving feed along the trough comprises a motor for reciprocating the trough, the end of the trough being provided with a pusher which extends into the pan for pushing feed in said pan against said sensing element as the trough reciprocates.

6. The device of claim 4 in which the means for moving feed along the trough comprises an auger in the trough and a motor for turning the auger.

7. In a device of the character described, the combination with a reciprocable conveyor trough, means for feeding discrete particles to and along said trough, a pan at the end of the trough and into which said trough discharges said particles, a movable feeler mounted in the pan and in the path of discharged particles, a pusher at the end of the trough and movable therewith to push discharged particles toward and against the feeler to move said feeler on its mounting, and control means actuated by said feeler for selectively operating and interrupting operation of said feed means in response to the position of the feeler dependent on the status of particles between the pusher plate and feeler.

8. The device of claim 7 in which the means for feeding discrete particles comprises a hopper having an outlet port and a gate movable across said port, said control means comprising means for selectively opening and closing said gate.

9. The device of claim 7 in which the means for feeding discrete particles comprises a motor for reciprocating said trough, said control means comprising means for actuating and de-actuating said motor.

10. The device of claim 7 in which said troughs and pan are disposed in a poultry room, the means for feeding discrete particles into said trough being disposed in a separate room concealed from the poultry by a wall, said wall having an opening through which said particles pass from one room to the other.

11. A feeder comprising a feed hopper, a control station remote from said feed hopper, a conveyor trough connecting said hopper and station, means for moving feed along said trough, regulating means for controlling the flow of feed along the trough and comprising a sensing element exposed to feed moved along the trough to said station and subject to displacement by the pressure of feed pushed thereagainst by the means for moving feed along the trough and control connections from said sensing element to said regulating means to shut off feed flow when the pressure of feed against said sensing element rises to a predetermined level and restore feed flow when the pressure of feed against said sensing element falls to a predetermined level.

12. A feeder comprising a distributing trough, a conveyor trough within the distributing trough, means supporting the conveyor trough above the bottom of the distributing trough, a series of openings spaced along the bottom of the conveyor trough, a conveyor member within said conveyor trough, means for actuating the conveyor member to convey feed along said conveyor trough and discharge it through said openings into the distributing trough, and means beneath said conveyor trough for deflecting laterally into said distributing trough feed discharged through said openings in the conveyor trough.

13. The device of claim 12 in which said deflecting means comprises an inverted V-shaped baffle beneath said conveyor trough.

14. The device of claim 12 in which said conveyor member comprises an auger, said openings having a greater extent laterally from the medial center line of the conveyor trough against the direction of auger rotation than toward the direction of auger rotation.

15. The device of claim 12 in which said distributing trough is provided with a bottom having a central medial upstanding rib constituting said deflecting means.

16. The device of claim 15 in which said rib is inverted V-shaped in cross section.

17. A feeder comprising a distributing trough, a conveyor trough within the distributing trough, said distributing trough being provided with upwardly extending side walls and means for suspending said conveyor trough in said distributing trough and from said side walls and comprising cross arms spanning across said distributing trough, first fastening means fastening said arms to said side walls and second fastening means fastening said conveyor trough to said cross arms from which said conveyor trough is suspended.

18. The device of claim 17 in which said conveyor trough is provided with side walls and laterally aligned openings in said side walls through which said cross arms extend, said second fastening means comprising spring wires having hook portions engaged over the margins of the side walls of the conveyor trough and intermediate resilient portions engaged beneath said cross arms.

19. The device of claim 17 in which said first fastening means comprises clips slidable along said cross arm, said side walls for the distributing trough being provided with in-turned lips, said clips being provided with slots adapted to receive said lips.

20. The device of claim 19 in which said cross arms are further provided with recesses in which said lips are seated, said clips being provided with resilient flanges adapted to snap into said cross arm recesses to lock the arms to the side wall lips.

References Cited in the file of this patent

UNITED STATES PATENTS

| | | |
|---|---|---|
| 2,646,023 | Virgil | July 21, 1953 |
| 2,683,439 | Markey | July 13, 1954 |
| 2,714,950 | Rubin | Aug. 9, 1955 |
| 2,742,138 | Potter et al. | Apr. 17, 1956 |
| 2,745,381 | Wallace et al. | May 15, 1956 |
| 2,745,539 | Hazen | May 15, 1956 |
| 2,785,791 | Cordis | Mar. 19, 1957 |
| 2,795,313 | Hazen | June 11, 1957 |
| 2,867,314 | Hansen | Jan. 6, 1959 |